United States Patent [19]

Towsend

[11] Patent Number: 4,960,018

[45] Date of Patent: Oct. 2, 1990

[54] METHOD OF MAKING AND USING MICROPHONES FOR RECORDING TELEPHONE CONVERSATIONS

[75] Inventor: Marvin S. Towsend, Rockville, Md.

[73] Assignee: Genvention, Inc., Rockville, Md.

[21] Appl. No.: 280,582

[22] Filed: Dec. 6, 1988

Related U.S. Application Data

[63] Continuation-in-part of Ser. No. 115,857, Nov. 2, 1987, Pat. No. 4,862,509.

[51] Int. Cl.$^5$ .............................................. B26D 1/00
[52] U.S. Cl. ....................................................... 83/13
[58] Field of Search .............................. 83/13; 379/67; 381/68.6, 169, 183, 187

*Primary Examiner*—Frank T. Yost
*Assistant Examiner*—Scott A. Smith
*Attorney, Agent, or Firm*—Marvin S. Towsend

[57] ABSTRACT

A method for recording and playing back telephone conversations is provided. In the method, a unitary microphone/speaker is positioned near the listener's ear so that the unitary microphone/speaker will be in the sound chamber defined by the air space between the telephone earpiece and the ear of the listener when the earpiece is pressed against the listener's ear. The unitary microphone/speaker is connected to an audio recorder/player, and the conversation is recorded. The telephone earpiece is removed from the listener's ear, and the recorded telephone conversation is played back by the recorder/player. The telephone conversation may be played back through the unitary microphone/speaker directly into the listener's ear. In accordance with another aspect of the invention, a method is provided for enabling the conversion of an ear mounted speaker into a unitary microphone/speaker for use in the sound chamber between the earpiece and the listener's ear. More specifically, an ear mounted, electromagnetic speaker whose transducer is small enough to fit into the sound chamber but whose housing is too large to fit into the sound chamber is obtained. Then, the size of the housing is reduced so that it is small enough to fit into the sound chamber. When the housing of the electromagnetic transducer of the ear mounted speaker is small enough to fit into the sound chamber, the speaker in the sound chamber is capable of functioning as a unitary microphone/speaker.

5 Claims, 4 Drawing Sheets

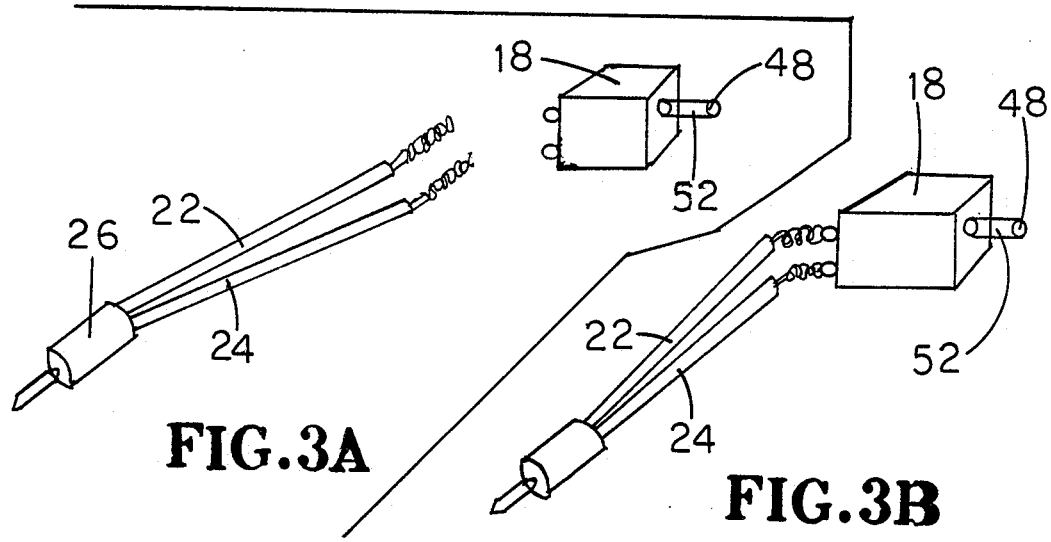
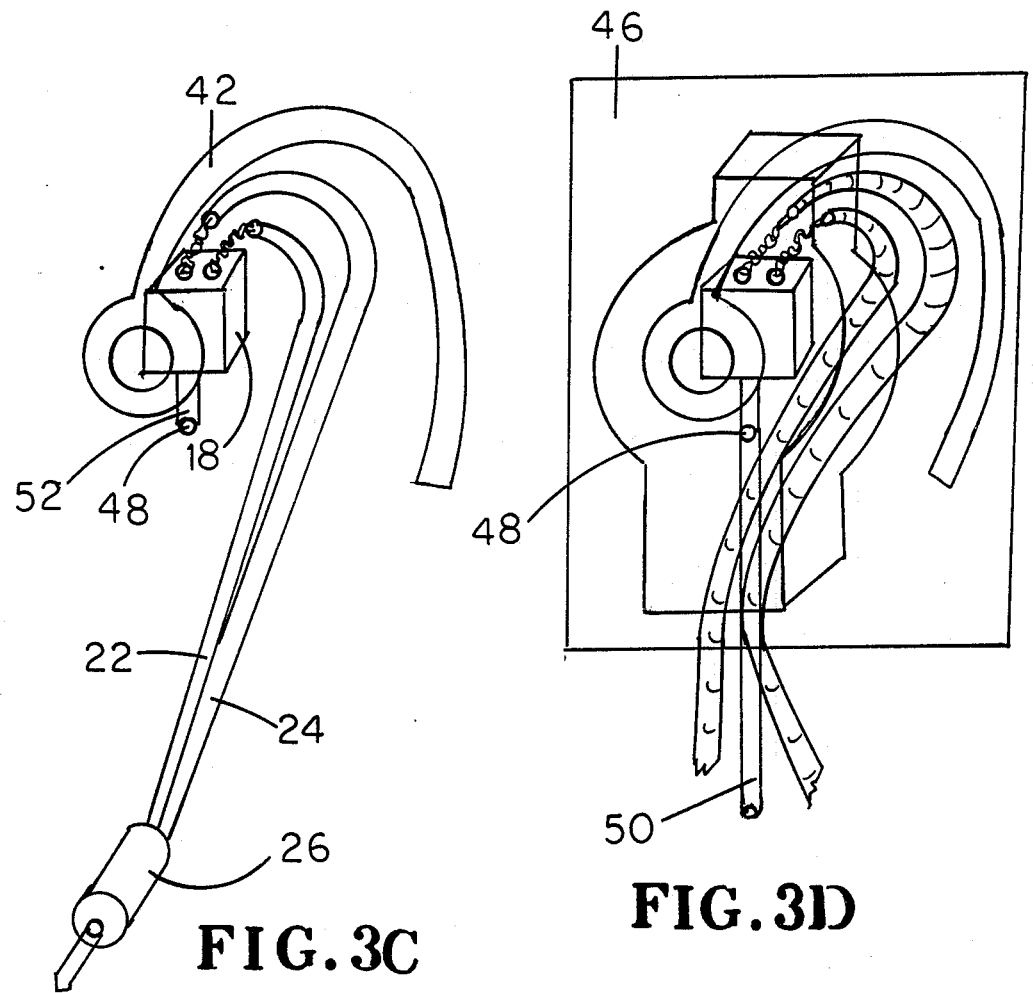

METHOD OF MAKING AND USING MICROPHONES FOR RECORDING TELEPHONE CONVERSATIONS

CROSS REFERENCE TO RELATED APPLICATION

This application is a continuation-in-part application of parent application Ser. No. 115,857, filed Nov. 2, 1987, by the same inventor, now U.S. Pat. No. 4,862,509, incorporated herein by reference.

FIELD OF THE INVENTION

The present invention relates to the field of recording audible conversations between persons, and more particularly to recording telephone conversations.

BACKGROUND OF THE INVENTION

In the art of recording conversations between persons, portable audio recorders are well known. With such recorders a portable microphone is associated with the sound recording apparatus, and the audio recorder records the conversation at the same time the participants in the conversation are conversing. The microphone is often integrated into the structure of the recorder. Otherwise, a portable microphone is connected to the sound recording apparatus by a wire conductor. Although such a conventional portable audio recorder is suitable for recording conversations between persons having a face-to-face conversation, such a sound recording system is not suitable for recording telephone conversations as they are being conducted using a hand-held held telephone receiver.

Telephone conversations conducted over a telephone equipped with a room speaker, commonly known as a speaker phone, can be recorded by conventional portable audio recording apparatus. However, when the telephone conversation is conducted using a hand-held receiver, conventional portable audio recording apparatus is not suitable.

Special transducers are known for recording telephone conversations conducted with hand-held telephone receivers. Such special transducers are adapted to physically contact a portion of the hand-held receiver at a location somewhere near the portion of the receiver that contacts the pinna portion of the ear of the user. Such known telephone transducers receive sound waves conducted through the body of the telephone receiver by maintaining a close physical contact therewith. They do not pick up sound waves from the air as does a conventional microphone. Such telephone transducers are generally of two types: a transducer having a ring-like adaptor for contacting the transducer with the telephone receiver; and a transducer having a suction cup for securing the telephone transducer onto the telephone receiver.

Both types of known transducers for hand-held telephone receivers have significant problems associated with their use. One problem relates to the conduction of sound through the telephone receiver to the telephone transducer. Not all telephone receivers are fabricated from materials which conduct sound efficiently. When conventional telephone transducers are employed with telephone receivers fabricated from materials which do not conduct sound efficiently, the sound transmitted through the telephone receiver to the telephone transducer ranges from poor to nonexistent. Therefore, it would be desirable to have a telephone sound pick up device whose operation does not depend upon sound transmitted through the body of the telephone receiver to the transducer.

Another problem associated with conventional transducers for recording telephone conversations is the effectiveness of physical contact between the telephone transducer and the telephone receiver. For example, the ring-like adaptor for a conventional telephone transducer may be formed in the shape of a circle and my not be effectively adapted for use on a telephone receiver having a square shaped earpiece. As another example, the suction cup adaptor for a telephone transducer may not readily maintain adequate suction if the suction cup or the telephone earpiece gets dirty. It is most disconcerting to have a suction cup type telephone transducer pop off of the telephone in the middle of an important conversation. Therefore, it would be desirable to have a telephone sound pick up device whose operation does not depend upon physical contact between a transducer adaptor and the body of the telephone receiver.

Another way to record telephone conversations is to have an audio recorder electrically connected to the telephone. With this arrangement, audio information is recorded directly as electrical information without passing through a conversion to sound energy. This method of recording telephone conversations is more expensive and complex than the use of a conventional audio recorder in a proprietary office environment, but this method is impossible to use when the telephone does not belong to the user such as a telephone in a public telephone booth. Therefore, it would be desirable to provide a telephone conversation recording system which does not require electrical connection to the telephone that is used and is capable of recording conversations using non-owned telephones such as in a public telephone booth.

Portable audio tape recorders and playback devices generally include a speaker so that playback of recorded sound is audible to the user. The speaker is generally housed in the general housing for the tape recorder, and the played back sound is audible to anyone who might be present in the general vicinity of the person using the recorder in the playback mode. Some recorders, however, are equipped with add-on ear speakers which bring the recorded sound directly to the ear of the user thereby providing greater privacy and causing less audible disturbance to persons in the general vicinity. Therefore, it would be desirable to provide an audio tape recorder and playback system that provides for recording telephone conversations and also permits playback of the conversations directly to an ear of the user.

A portable audio tape recorder and playback device generally includes a microphone for recording sound and a speaker for playing back recorded sounds. It would be desirable, however, to provide a single microphone/speaker that both records sounds when the tape recorder is in the record mode and that also serves as a speaker to play back recorded sounds when the recorder is used in the play back mode.

Add-on ear speakers for audio playback devices are generally not marketed as microphones and are not suitable for use as a microphone for recording telephone conversations. More specifically, the ear speaker may be an electromagnetic transducer that is housed in a housing that is relatively large; that is too large to fit into the air space present when a telephone ear piece is placed in contact with the ear of the listener. Because add-on ear speakers are relatively inexpensive and are readily available, especially electromagnetic add-on ear speakers, it would be desirable to modify an add-on ear speaker so that it is small enough to fit in the air space between the telephone ear piece and the ear of the listener.

During the course of a telephone conversation, except for a speaker phone, a listener generally has his or her ear in contact with the telephone earpiece. The air space present between the telephone earpiece and the listener's ear serves as an effective sound chamber for conducting both sides of the telephone conversation to the listener's ear. Nevertheless, the prior art methods of recording telephone conversations do not take advantage of the desirable sound characteristics of this sound chamber. More specifically, the suction cup transducer and the ring-like transducer attach to the telephone earpiece outside this sound chamber. Therefore, it would be desirable to provide a transducer for recording telephone conversations that is placed in the sound chamber between a telephone earpiece and the ear of the listener.

SUMMARY OF THE INVENTION

Accordingly, it is a primary object of the present invention to provide a telephone conversation recording device whose operation does not depend upon sound transmitted through the body of the telephone receiver to the pick up device.

Another object of the invention is to provide a telephone conversation pick up device whose operation does not depend upon physical contact between a transducer adaptor and the body of the telephone receiver.

Another object of the invention is to provide a means for recording telephone conversations without making electrical connection with the telephone.

Yet another object of the invention is to provide a telephone conversation recording system that is capable of recording conversations using non-owned telephones such as in a public telephone booth.

Yet another object of the invention is to provide an audio tape recorder that provides for recording telephone conversations and also permits playback of the conversations directly to an ear of the user.

Still another object is to provide a single microphone/speaker that both records sounds when the tape recorder is in the record mode and that also serves as a speaker to play back recorded sounds when the recorder is used in the play back mode.

Another object of the invention is to provide a transducer for recording telephone conversations that is placed in the sound chamber between a telephone earpiece and the ear of the listener.

Yet another object of the invention is to provide a method of modifying an add-on ear speaker so that it is small enough to fit in the sound chamber defined by the air space between the telephone ear piece and the ear of the listener.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a method is provided for recording telephone conversations from a telephone having an earpiece. The listener has an ear against the telephone earpiece, and an air space is present between the telephone earpiece and the listener's ear. The air space defines a sound chamber. The recording method is characterized by the steps of: positioning a microphone near the listener's ear so that the microphone will be in the air space when the telephone earpiece is against the listener's ear; placing the telephone earpiece against the listener's ear, whereby the microphone is located in the sound chamber; and recording the telephone conversation by means of an audio recorder.

In accordance with another aspect of the invention, a method for recording and playing back telephone conversations is provided. In carrying out the method of recording and playing back the following steps are taken: positioning a unitary microphone/speaker near the listener's ear so that the unitary microphone/speaker will be in the sound chamber defined by the air space when the telephone earpiece is against the listener's ear; placing the telephone earpiece against the listener's ear, whereby the unitary microphone/speaker is located in the sound chamber; recording the telephone conversation by means of an audio recorder/player in a recording mode; removing the telephone earpiece from against the ear; and playing back the recorded telephone conversation by means of the audio recorder/player in a playback mode. The telephone conversation may be played back through the unitary microphone/speaker.

In accordance with another aspect of the invention, a method is provided for enabling the conversion of an ear mounted speaker into a microphone for use in the sound chamber between the earpiece and the listener's ear. More specifically, a speaker whose transducer is small enough to fit into the sound chamber but whose housing is too large to fit into the sound chamber is obtained. Then, the size of the housing is reduced so that it is small enough to fit into the sound chamber.

Yet another aspect of the invention relates to a method for providing a unitary microphone/speaker for use in recording and playing back telephone conversations. The unitary microphone/speaker is used in the sound chamber between the telephone earpiece and the listener's ear. The method comprises the steps of: obtaining a speaker whose transducer is small enough to fit into the sound chamber but whose housing is too large to fit into the sound chamber; and reducing the size of the housing so that it is small enough to fit into the sound chamber, whereby the speaker in the sound chamber is capable of functioning as a unitary microphone/speaker. The ear mounted speaker, capable of being converted into a unitary microphone/speaker used in the above-described sound chamber, may be an electromagnetic speaker.

In accordance with yet another aspect of the invention, another method is provided for employing a microphone to record telephone conversations where the microphone is used in a sound chamber defined by a telephone earpiece in contact with a listener's ear. The method includes the steps of: obtaining a transducer small enough to fit into the sound chamber; connecting the transducer to wires connected to a jack for connection to a portable audio recorder; and fabricating a housing around the transducer and connection to the wires wherein the housing containing the transducer is small enough to fit in the sound chamber.

In accordance with yet another aspect of the invention, another method is provided for employing a unitary microphone/speaker for use in recording and playing back telephone conversations wherein the unitary microphone/speaker is used in a sound chamber defined by a telephone earpiece in contact with a listener's ear. The method includes the steps of: obtaining a unitary microphone/speaker small enough to fit into the sound chamber; connecting the unitary microphone/speaker to wires connected to a jack for connection to a portable audio recorder; and fabricating a housing around the unitary microphone/speaker and connection to the wires wherein the housing containing the unitary microphone/speaker is small enough to fit in the sound chamber.

More specifically, the housing can be fabricated around the unitary microphone/speaker by carrying out the following steps: obtaining a mold for the housing; obtaining an ear piece for bonding with a unitary microphone/speaker; placing the ear piece and the unitary microphone/speaker with wires connected to it into the mold; protecting a sound passageway on the unitary microphone/speaker from exposure to housing resin; applying housing resin to the ear piece and the protected unitary microphone/transducer while in the mold; permitting the housing resin to cure to obtain a unitary microphone/speaker connected to wires encapsulated in a housing; removing the protection from the sound passageway; and removing the housing-encapsulated unitary microphone/speaker from the mold.

Suitable housing resins include epoxys, acrylics, and artificial rubbers.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 3A-3E are stepwise schematic diagrams in sequence depicting a method of the invention for fabricating an earsupported housing around a unitary microphone/speaker connected to wires and bonded to an ear piece.

DETAILED DESCRIPTION OF THE PREFERRED EMBODIMENTS

Figure 1:
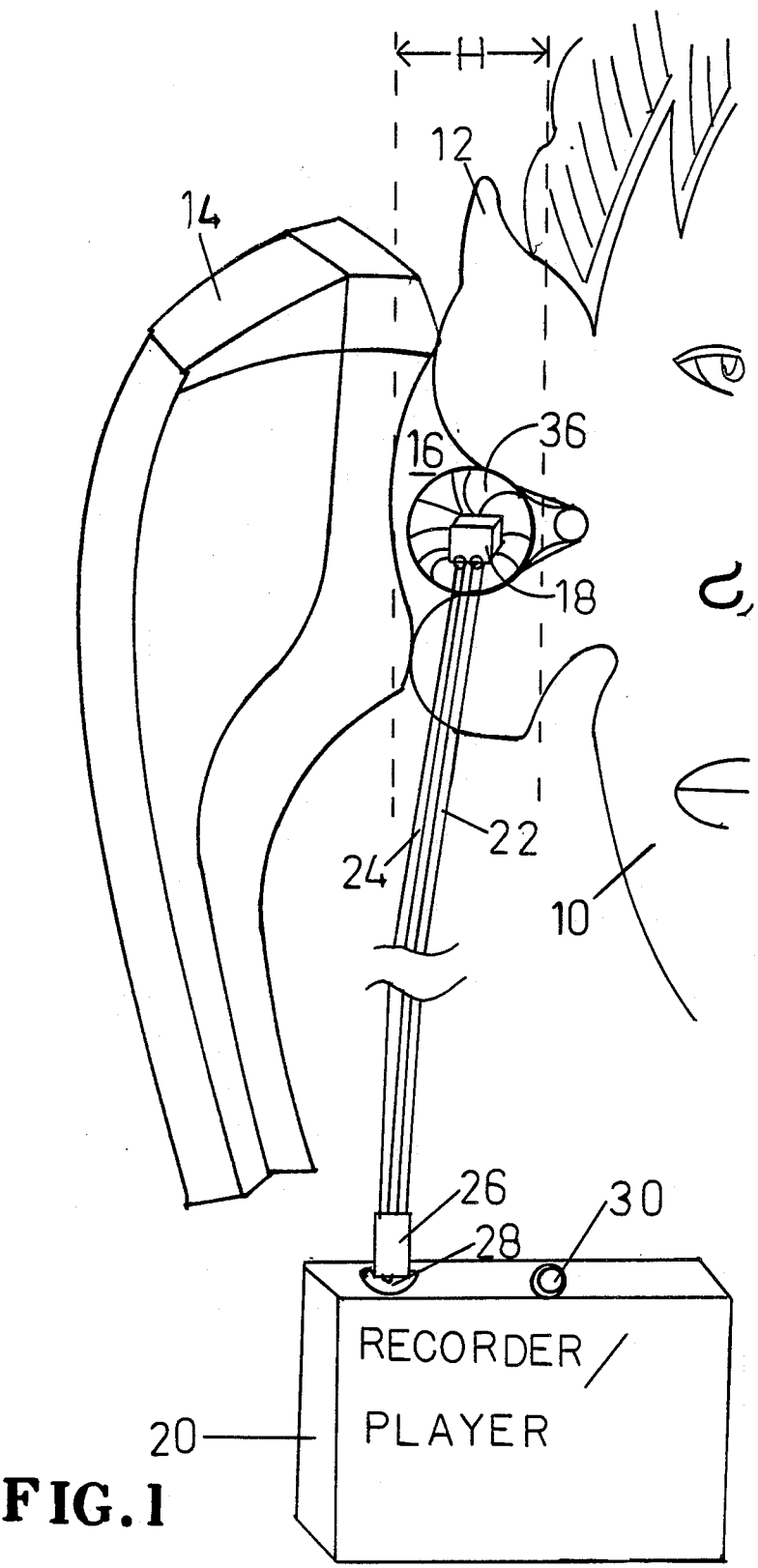
FIG. 1 a schematic view of an embodiment of the invention wherein a microphone or unitary microphone/speaker is located in the sound chamber between the telephone earpiece and the pinna of the ear of the user.

Referring to FIG. 1, the implementation of a method for recording and playing back telephone conversations from a telephone having an earpiece is depicted. The listener 10 has the pinna 12 of his ear against the telephone earpiece 14. An air space is present between the telephone earpiece 12 and the listener's pinna 12. The air space defines a sound chamber 16. The recording and playing back method is characterized by the steps of: positioning a unitary microphone/speaker 18 contained in a housing 36 near the listener's ear so that the unitary microphone/speaker 18 and housing 36 will be in the sound chamber 16 when the telephone earpiece 14 is against the listener's pinna 12; placing the telephone earpiece 14 against the listener's pinna 12, whereby the unitary microphone/speaker 18 and housing 36 are located in the sound chamber 16; and recording the telephone conversation with an audio recorder/player 20. Wires 22 and 24 interconnect a plug 26 for the recorder/player 20 and the unitary microphone/speaker 18.

When the plug 26 is in the "microphone" jack 28 of the recorder/player 20, the recorder/player 20 records the telephone conversation. Alternatively, when the plug 26 is in the "speaker" jack 30 of the recorder/player 20, the recorder/player 20 plays back the recorded telephone conversation.

Figure 2A:
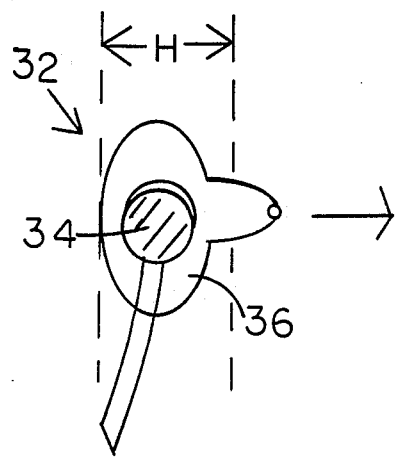
FIGS. 2A-2C are stepwise schematic diagrams in sequence depicting a method for converting an overly large ear-mounted electromagnetic speaker into a unitary microphone/speaker small enough to be located in the sound chamber between the telephone earpiece and the pinna of the user's ear.
Figure 2B:
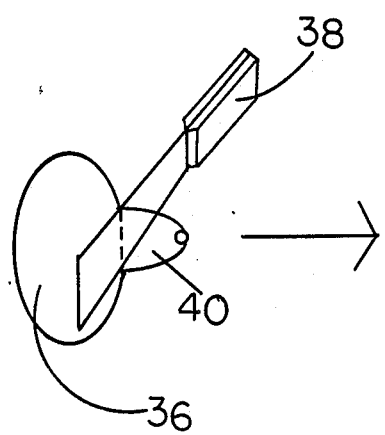
Figure 2C:
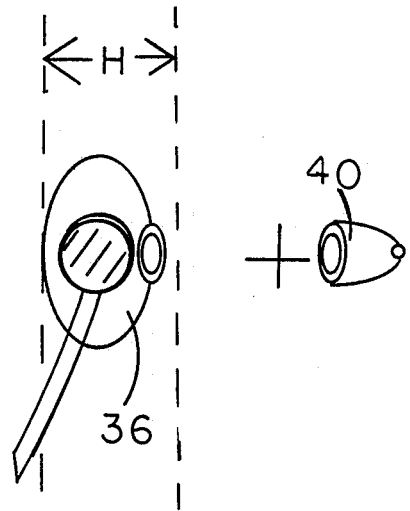

Turning to FIGS. 2A-2C, a method is depicted for converting an ear mounted speaker into a microphone for use in the sound chamber between the earpiece and the listener's ear. More specifically in FIG. 2A, a speaker 32 includes an electromagnetic transducer 34 that is small enough to fit into the sound chamber 16 (in FIG. 1) whose largest lateral dimension is depicted by distance H but whose housing 36 is longer than distance H and cannot fit into the sound chamber 16 (in FIG. 1).

In FIG. 2B, the size of the housing 36 is reduced by a cutting plane 38, which may be a razor blade or the like, by cutting off a cylindrical projection 40 which is designed to fit into the auditory meatus of a user's ear.

In FIG. 2C, the housing 36 is now smaller than the distance H and can readily fit inside the sound chamber 16. The projection 40 has been severed from the housing 36 and be discarded. Once the projection 40 has been severed from the housing 36, whereby the electromagnetic transducer 34 and its modified housing 36 can be located in the sound chamber 16, the electromagnetic transducer 34 can serve as a unitary microphone/speaker 18.

As depicted in FIGS. 3A-3E, a method is provided for fabricating an encapsulating housing for a unitary microphone/speaker 18 affixed to a hook 42 supported by the pinna of the user's ear. More specifically, the encapsulating method includes the steps of: obtaining a unitary microphone/speaker 18 small enough to fit into the sound chamber; connecting the unitary microphone/speaker 18 to wires 22 and 24 connected to a plug 26 for connection to a portable audio recorder/player; and fabricating a housing 44 which encapsulates the unitary microphone/speaker 18 and its connection to the wires 22 and 24. The housing 44, with its encapsulated unitary microphone/speaker 18, is small enough to fit in the sound chamber 16 of FIG. 1.

Figure 3E:
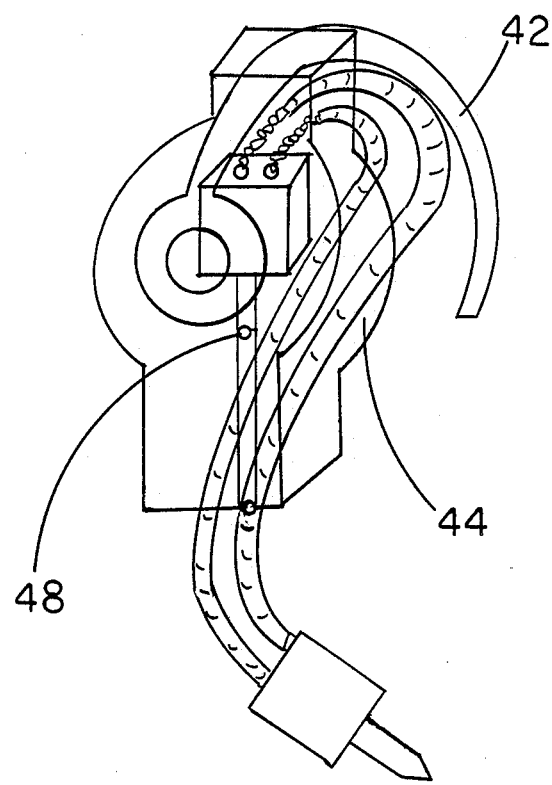

More specifically, the housing 44 in FIG. 3E can be fabricated around the unitary microphone/speaker 18 by carrying out the steps indicated as follows. First, a unitary microphone/speaker 18 is connected to wires 22 and 24 by soldering (FIGS. 3A and 3B). The wires 22 and 24 are connected to a plug 26. The unitary microphone/speaker 18 soldered to the wires 22 and 24 is placed in contact with an ear hook 42 conventionally used for supporting an ear-mounted speaker (FIG. 3C).

A mold 46 is obtained or made. A suitable mold material is Ivory brand face soap. The ear hook 42 and unitary microphone/speaker 18 connected to wires 22 and 24 are placed in a mold 46. The unitary microphone/speaker 18 generally has a sound passageway 48 through which sound passes into the interior of the unitary microphone/speaker 18. A long thin tube 50 is installed on the end of a hollow projection 52 which defines the sound passageway 48. The tube 50 prevents the sound passageway 48 from being clogged or interfered with by the resin to be applied (FIG. 3D). Resin (e.g. siliconized acrylic caulk, white C-700, obtained at a Channel Home Center) is then applied to the mold 46 covering the unitary microphone/speaker 18, the connection to the wires 22 and 24, and the portion of the ear hook 42 which is in contact with the unitary microphone/speaker 18. The resin is permitted to cure (e.g. 24 hours) whereby a housing 44 is formed which encapsulates the unitary microphone/speaker 18 and its wire connections. After the resin has cured, the tube 50 is removed from the hollow projection 52. Then the housing-encapsulated unitary microphone/speaker is removed from the mold.

Numerous benefits are obtained from following the principles of the invention. With the methods of the invention, telephone conversations can be recorded without having any recording apparatus in contact, either mechanical or electrical contact, with the telephone equipment. In this way, a telephone conversation can be readily recorded using non-owned telephones such as in a public telephone booth. In accordance with the invention, the same transducer that is used to record telephone conversations can be used to playback the telephone conversations in relative privacy.

With the invention, a transducer is used to record telephone conversations by being placed in the sound chamber between the telephone earpiece and the ear of the listener. Also, with the invention, a method is provided for modifying an add-on ear speaker so that it is small enough to fit in the sound chamber defined by the telephone ear piece and the ear of the listener. Also, with the invention, a method is provided for fabricating a sound transducer in a housing or a unitary microphone/speaker in a housing that is small enough to fit in the sound chamber.

The foregoing description of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method for providing a microphone for use in recording telephone conversation, the microphone for use in a sound chamber defined by a telephone earpiece in contact with a listener's ear, the method comprising the steps of;
    obtaining a speaker whose transducer is small enough to fit into the sound chamber but whose housing is too large to fit into the sound chamber, reducing the size of the housing so that it is small enough to fit into the sound chamber.

2. The method described in claim 1 wherein the speaker is an electromagnetic speaker.

3. A method for providing a unitary microphone/speaker for use in recording and playing back telephone conversations, the unitary microphone/speaker for use in a sound chamber defined by a telephone earpiece in contact with a listener's ear, the method comprising the steps of:
    obtaining a speaker whose transducer is small enough to fit into the sound chamber but whose housing is too large to fit into the sound chamber,
    reducing the size of the housing so that it is small enough to fit into the sound chamber, whereby the speaker in the sound chamber is capable of functioning as a unitary microphone/speaker.

4. The method described in claim 3 wherein the speaker is an electromagnetic speaker.

5. The method described in claim 3 wherein the speaker is an electromagnetic speaker marketed solely as a speaker but is capable of serving as a unitary microphone/speaker when the speaker housing is reduced to a size small enough to fit into the sound chamber.

* * * * *